No. 856,610. PATENTED JUNE 11, 1907.
O. W. STEINDORF.
TRIPOD.
APPLICATION FILED JULY 12, 1906.
2 SHEETS—SHEET 1.
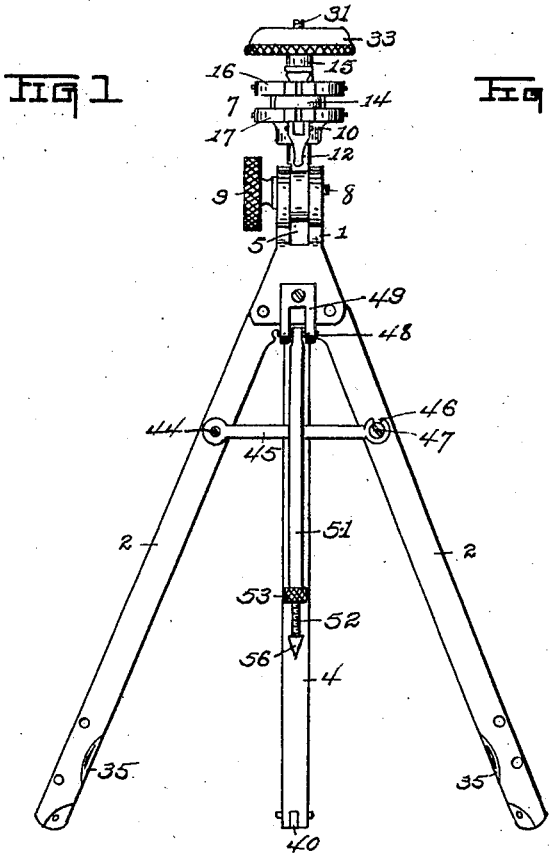
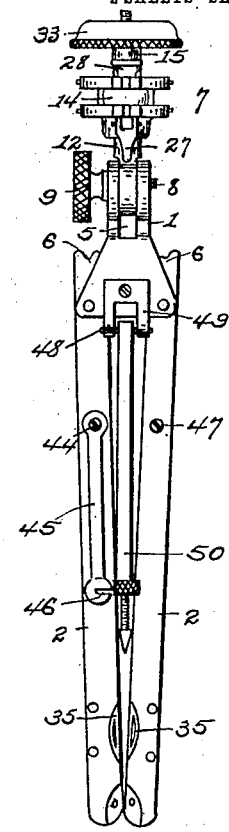
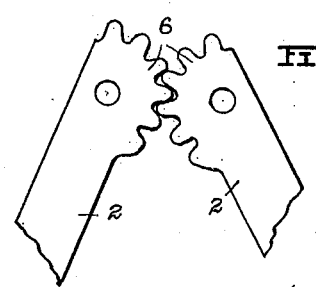
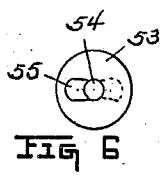
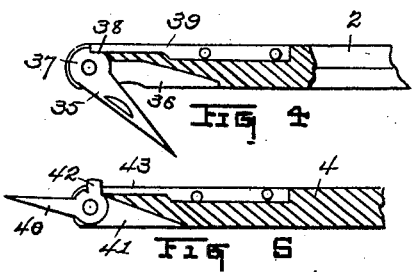
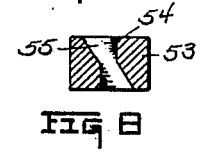
Witnesses:
Robt. F. Dilworth
E. H. Jenkart
Inventor.
Otto W. Steindorf.
By H. E. Dunlap.
Attorney
THE NORRIS PETERS CO., WASHINGTON, D. C.

No. 856,610. PATENTED JUNE 11, 1907.
O. W. STEINDORF.
TRIPOD.
APPLICATION FILED JULY 12, 1906.
2 SHEETS—SHEET 2.
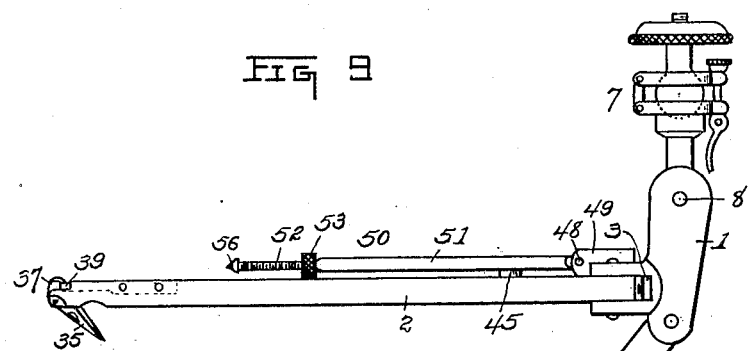
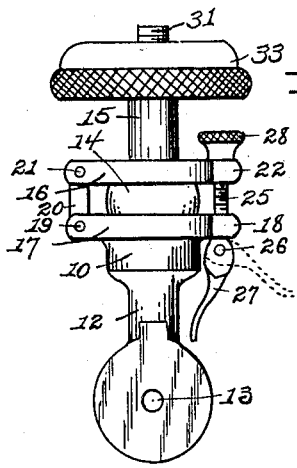
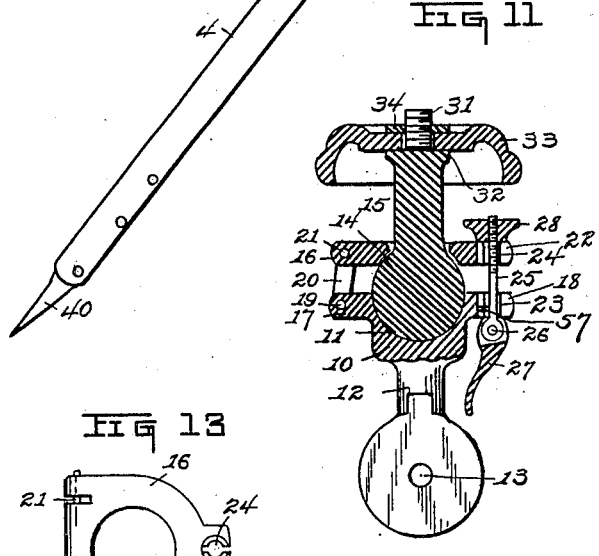
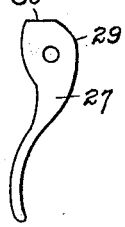
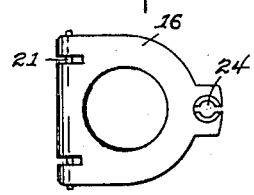
Witnesses:
Robt F. Dilworth
P. A. Lenkard
Inventor.
Otto W. Steindorf.
By H. E. Dunlap
Attorney

UNITED STATES PATENT OFFICE.

OTTO W. STEINDORF, OF WHEELING, WEST VIRGINIA.

TRIPOD.

No. 856,610.    Specification of Letters Patent.    Patented June 11, 1907.

Application filed July 12, 1906. Serial No. 325,917.

*To all whom it may concern:*

Be it known that I, OTTO W. STEINDORF, a citizen of the United States of America, and a resident of Wheeling, county of Ohio, and State of West Virginia, have invented certain new and useful Improvements in Tripods, of which the following is a specification.

My invention relates to new and useful improvements in tripods, and more particularly to a "pony" tripod for cameras; and it has for its chief object to provide an adjustable folding tripod, or camera support, adapted for mounting upon a plain flat surface and for application in a stationary position to a post, tree, fence, wall, or other fixed object.

A further object is to provide a camera support which may be readily adjusted to hold a camera in any desired position. And a still further object is to provide a tripod which is light in weight and which may be folded and conveniently carried either in the hand or pocket.

With these and other objects in view, my invention finally consists in the particular construction, arrangement and combination of parts which will hereinafter be fully described, reference being herein had to the accompanying drawings, forming a part of this specification, in which—

Figure 1 is a front elevation of my invention standing in an upright position, as on a flat surface; Fig. 2 is a similar view, showing the legs of the device folded together; Fig. 3 is an elevation, enlarged, illustrating the gear-segments of the legs; Fig. 4 is a partial longitudinal section of one of the front legs, illustrating the prong and spring thereof; Fig. 5 is a similar view of the rear leg, illustrating its prong and spring; Fig. 6 is an enlarged end view of the brace-adjusting nut; Fig. 7 is a cross-sectional view of the same with the threaded stem in place; Fig. 8 is a similar view of the same with the stem removed; Fig. 9 is a side elevation of the invention, illustrating the position which it occupies when mounted upon a post, tree, fence, or wall as a support; Fig. 10 is an enlarged side elevation of the ball and socket joint; Fig. 11 is a vertical sectional view of the same; Fig. 12 is an enlarged view of the eccentric lever; and Fig. 13 is a top plan view of the hinged plate, detached.

Referring to said drawings, in which like reference-numerals designate like parts throughout the several views—1 indicates a head to which two legs 2, herein termed "front legs", are pivoted directly opposite each other in a bifurcation 3, and a third, or rear, leg 4 is pivoted in the rear end of a second bifurcation 5 which is provided in said head at right angles to said bifurcation 3. Formed integral with the front legs 2 on the inner or adjacent faces of the upper ends thereof are corresponding gear-segments 6 in meshing engagement, said segments serving as means for at all times maintaining said legs, when spread apart, at an equal distance from a vertical line passing through the center of said head. A ball and socket joint 7 is pivotally mounted in the front, or upper, end of said bifurication 5 upon an adjusting-screw 8 having a milled head 9. Said ball and socket joint consists of a cup 10 with a socket 11 therein and having an integral stem 12 with an eye 13 through which said adjusting-screw 8 is passed; a ball 14 mounted in said socket 11 and having an integral stem 15; a hinged plate or collar 16 encircling said stem 15; and means for causing said plate or collar 16 to firmly engage and bind upon said ball 14. As illustrated, the cup 10 has an integral collar or flange 17 with a flat upper face and having a forwardly-projecting lip 18. Attached to a pivot 19 which extends laterally through the rear end of said collar 17 are the lower ends of vertical links 20 whose upper ends are pivotally attached to a pivot 21 which extends laterally through the rear end of said plate or collar 16. Said plate or collar 16 is similar in size and form to the integral collar 17, and has an integral lip 22. Registering vertical holes 23 and 24 are respectively provided in said lips 18 and 22. Extending through said holes and connecting the front ends of said collars 16 and 17 is a bolt 25 which is screw-threaded at its upper end and has an eye in its lower end through which is projected a pin 26 upon which is mounted an eccentric lever 27. Mounted upon the threaded end of said bolt 25 is an adjusting-nut 28. When the said nut 28 has been properly adjusted, the eccentric lever 27 may be manipulated to cause the plate or collar 16 to impinge upon said ball 14 to hold the same in fixed position. As shown in Fig. 12, said eccentric lever is provided with a rounded rear face 29 which merges with a flat upper face 30. The stem 15 carried by the ball 14, as before stated, is encircled or embraced by said plate or collar 16. The opening in said plate or collar through which said stem passes is made sufficiently large to admit of considerable play in the ball 14. The extreme end of said stem 15 is threaded, as shown at 31, to receive a camera thereon, and an integral flange or collar 32 is provided on said stem below said threaded end. Mounted upon said end to rest upon said collar is a disk or cap 33 which serves as a base for the camera when it is secured upon the threaded end 31. A nut 34 is provided on said end 31 for firmly holding said disk 33 in place.

Pivoted in the lower end of each of the front legs 2 is a pointed inwardly-, downwardly- and rearwardly-inclined spur or prong 35 which is closable in a channel or groove 36 provided in the leg. The head 37 of said spur or prong 35 is rounded, substantially as shown in Fig. 4, and has a recess 38 therein which is adapted to be engaged by the end of a longitudinal metal spring 39 which is secured in the leg on the side opposite said channel 36. The end of said spring 39 slides freely over the rounded portion of the head 37 as the spur or prong 35 is being opened outward, but when it engages said recess 38, which is provided at a suitable point in said head, said spur or prong is firmly held thereby at the proper angle and is prevented from opening farther under any pressure.

A spur or prong 40 is pivoted in the end of the rear leg 4, said spur being adapted for folding or closing within a suitable channel or groove 41 in said leg. The head of said spur or prong is substantially circular in form, as shown in Fig. 5, and has thereon at a suitable point a radial arm 42 adapted to be engaged by the end of a spring 43, similar to the springs 39, which is mounted in said leg 4. Said arm 42 not only serves as a stop to be engaged by said spring 43, but also for a lug by means of which said spur or prong 40 may be grasped to withdraw it from the channel or groove 41. When open, said spur or prong 40 stands in line with the leg 4 to which it is attached.

Upon the front face of one of the legs 2, as at 44, is pivoted one end of a bar or hook 45, the opposite end of which on its under edge is provided with a recess 46 for interlocking engagement with a stud 47 in the face of the opposite leg 2.

Mounted upon a pivot 48, provided in a lug 49 which is secured upon the front face of the head 1 midway between the pivotal connections of said legs 2, is a telescopic extension rod or brace 50, consisting of a tubular rod 51 carrying therein a slidable exteriorly-threaded stem 52 having a knob upon its inner end. Mounted upon said stem 52 outside the tubular rod 51 is an adjusting-nut 53 adapted to be adjusted upon said stem to regulate the distance which it projects from the tubular rod and to prevent said stem from being forced up in said rod 51. Said adjusting-nut 53 is provided with a central threaded bore 54 which is bisected by a diagonally-extending smooth bore 55 slightly larger in caliber than said threaded bore. Said smooth bore 55 and threaded bore 54 communicate throughout their lengths, as shown in Figs. 6, 7 and 8, and to throw said nut, when in engagement with the threads, out of engagement therewith, the nut is tilted to one side, as shown in dotted lines in Fig. 7, when it will slide freely over the threads of the stem 52. The object of this construction of nut is to render it more readily adjustable to any position on the stem than would be the case were it necessary to thread the same thereover in the ordinary manner. When the nut has been slipped to the desired position on the stem 52, the nut is thrown into a position with its threads in engagement with the threads of said stem, and said stem is forced back within the tubular rod until the face of the nut stands squarely against the end of said tubular rod, beyond which point the stem can not be forced.

When not in use, the tripod may be closed, or folded, as shown in Fig. 2, or it may be further closed by folding the ball and socket joint downward upon its pivot 8 until it lies close against the faces of the legs 2, when it may be conveniently carried either in the hand or pocket. When used upon a level surface, as upon a table or box, the legs are spread apart and the device set upright thereon, as shown in Fig. 1.

When it is desired to attach my device to a post, tree, or similar object as a support for a camera, the legs 2 are spread apart to embrace the sides of the object with the spurs or prongs 35 in supporting engagement therewith, and the spur or prong 40 is set in engagement with the face of the object to brace or support the same, all the parts of the device assuming substantially the positions shown in Fig. 9. To further brace the device and prevent the accidental disengagement of the spurs or prongs 35 from the object, the telescopic brace 50 is extended to bear against the object with its beveled point 56, and the adjusting-nut 53 is slipped along the stem 52 against the end of the tubular rod 51 to prevent said stem from slipping inward.

From the foregoing it will be seen that I have described my invention at length and with regard to the smallest details of construction. It is obvious, however, that various alterations may be made in the construction and arrangement of some of the parts without departing from the general spirit and scope of the invention. Hence I do not wish to limit myself to the precise construction and arrangement of parts herein shown and described.

Having thus fully described my invention, what I claim as new and desire to secure by Letters Patent is:—

1. In a tripod for cameras, a head, two oppositely disposed legs pivotally mounted in said head, said legs having intermeshing gear segments, a third leg pivoted in said head, and means for mounting a camera upon said head.

2. In a tripod for cameras, a head having two bifurcations therein at right angles to each other, two oppositely disposed legs pivotally mounted in one of said bifurcations, said legs having intermeshing gear segments, a third pivoted in the other of said bifurcations, a pivoted spur carried by each of the oppositely disposed legs, said spurs being adapted for closing up within the legs, means for holding each of said spurs when open in an inwardly downwardly inclined position, a pivoted spur carried by the third leg, means for holding the last mentioned spur when open in line with said third leg, bracing means for said oppositely disposed legs, and means for mounting the camera on said head.

3. In a tripod for cameras, the combination with a head having pivoted legs, said legs having post or tree engaging means, of an extension brace carried by said head, said brace comprising a tubular rod, an exteriorly threaded stem slidable within said rod and projecting therefrom, and an adjusting nut on said stem, said nut having a central threaded bore and a diagonally extending smooth bore of larger caliber than said threaded bore, said bores bisecting each other.

4. In a tripod, a head, means for mounting a camera on said head, two oppositely-disposed legs pivotally mounted in said head, said legs having intermeshing gear-segments, a third leg pivotally mounted in said head, and pivoted spurs carried by each of said legs.

5. In a tripod, a head, means for mounting a camera on said head, two oppositely-disposed legs pivotally mounted in said head, said legs having intermeshing gear-segments, a third leg pivotally mounted in said head, pivoted spurs carried by each of said legs, and an extensible brace carried by said head.

6. In a tripod, a head, means for mounting a camera on said head, two oppositely-disposed legs pivotally mounted in said head, said legs having intermeshing gear-segments, a third leg pivotally mounted in said head, pivoted spurs carried by each of said legs, and means for holding said spurs in adjusted positions.

7. In a tripod, a head, and three legs pivoted in said head, two of said legs having intermeshing gear segments.

8. In a tripod, a head, two oppositely-disposed legs pivotally mounted in said head, intermeshing gear-segments carried by said legs, a third leg pivoted in said head, and spurs carried by each of said legs.

9. In a tripod, a head, two oppositely-disposed legs pivotally mounted in said head, intermeshing gear-segments carried by said legs, a third leg pivoted in said head, and foldable spurs carried by each of said legs.

10. In a tripod, two oppositely disposed legs pivotally mounted in a suitable head, said legs having intermeshing gear-segments, a third leg pivoted in said head, spurs carried by each of said legs, and means for holding said spurs in adjusted positions.

11. In a device of the character described, a pivoted brace comprising a tubular rod, a threaded stem slidable within said rod and projecting therefrom, and an adjusting nut on the outwardly-projecting end of said stem, said nut having a central threaded bore and a diagonally extending smooth bore of larger caliber than said threaded bore, said bores bisecting each other.

Signed by me in the presence of two subscribing witnesses.

OTTO W. STEINDORF.

Witnesses:
H. E. Dunlap,
Robt. F. Dilworth.